United States Patent Office 3,212,904
Patented Oct. 19, 1965

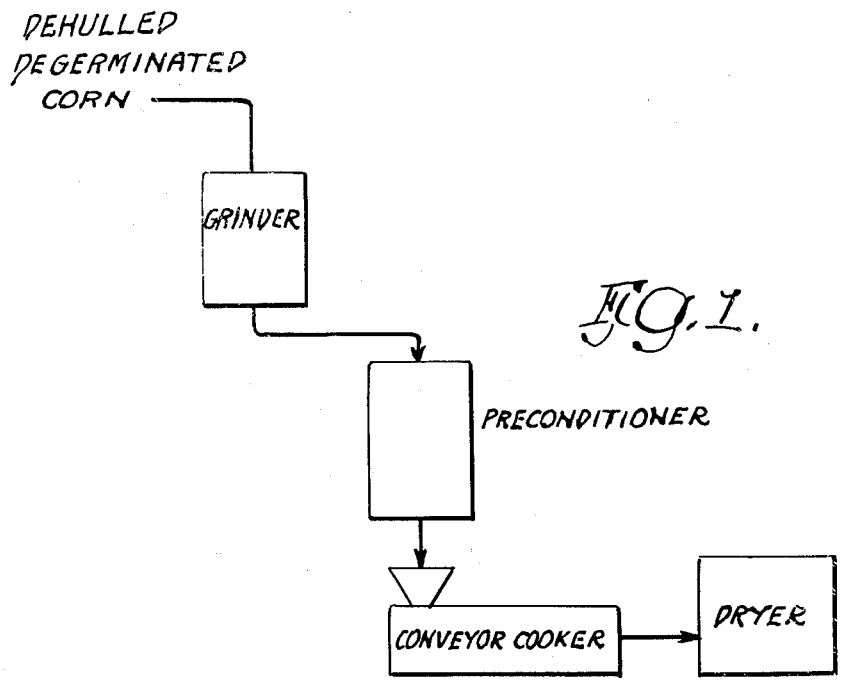
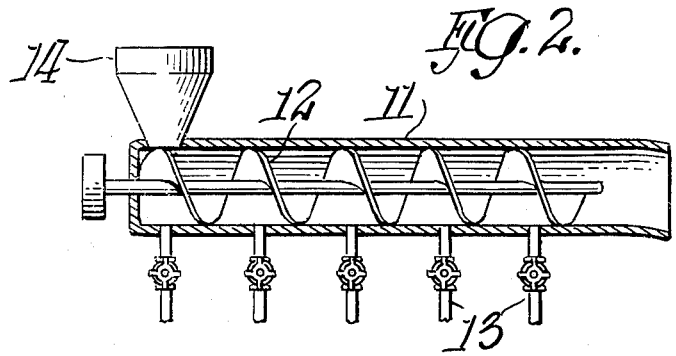

3,212,904
PROCESS FOR PREPARING A PRECOOKED CORN FLOUR
Max R. Gould and Donald L. Swartz, Barrington, Ill., assignors to The Quaker Oats Company, Chicago, Ill., a corporation of New Jersey
Filed Feb. 4, 1963, Ser. No. 256,072
7 Claims. (Cl. 99—93)

This invention relates to cereal flours and more particularly to a cereal flour prepared from dehulled, degerminated corn.

Corn flours suitable for making arepas or polenta bases and which have satisfactory shelf life, e.g. do not become spoiled or stale during the interim between manufacture and actual use by the consumer, are economically valuable. Arepas are unleavened griddle-cakes, pancakes or biscuits made from cooked and ground corn which are popular in many South American countries. Polenta is a dish of Italian origin which uses a cooked corn meal mush as a base. Corn flours suitable for preparing arepas and having satisfactory shelf life can be prepared by the process disclosed and claimed in United States Patent No. 3,046,139 which issued July 24, 1962 to Max R. Gould, Leo P. Carroll and Ralph Cervantes. Prior to that patented process in order to prepare satisfactory arepas it was necessary for the consumer to cook the corn in water, drain off the excess water, grind the wet corn in a grinder and then almost immediately thereafter, to avoid spoilage, form the doughy mass into cakes and bake them in an oven or on a grill.

Prior to the process and product described herein polenta has been made by cooking raw corn meal in water with continuous strring for up to 25 minutes to form a corn meal mush base for the polenta.

Degerminated, dehulled white corn is traditionally used for arepas, whereas degerminated, dehulled yellow corn meal is traditionally used for polenta.

An object of this invention is to provide a new process for the production of a precooked, storage-stable flour from dehulled and degerminated corn.

Another object of this invention is to produce a precooked, dry, white corn flour which when admixed with about 2 parts to about 3 parts by weight of water produces a dough which is readily handled and formed and which when further subjected to baking temperatures produces a crusted biscuit in which the undercrust portion is comparable to the original dough.

A further object of this invention is to produce a precooked, dry yellow corn flour or meal which, when reconstituted or rehydrated with about 3 to 5 parts by weight of boiling or hot water, heated at least 5 seconds, and poured into a mold to cool, produces a suitable polenta base.

A further object of this invention is to produce a precooked, milled and dried corn flour having a minimum amount of water and which subsequent to the cooking and prior to the drying comprises substantially entirely swollen whole starch granules, the starch granules being swollen to such an extent that their bulk volume is from about 2 to about 3 times their bulk volume prior to cooking.

A still further object of the invention is to provide a novel process for the preparation of the aforesaid corn flour which can be carried out in convenient manner and in relatively short time to produce a corn flour containing therein substantially all beneficial materials soluble in the water employed for cooking the corn.

In accordance with the invention these objects are accomplished by subjecting dehulled and degerminated corn to a series of steps which comprises comminuting the dehulled, degerminated corn to a relatively small particle size, adjusting the moisture content thereof to within a prescribed range, heating the comminuted moistened corn at substantially atmospheric pressure to a temperature not substantially above 212° F. to cook the corn and finally drying the cooked corn to a moisture content of not more than 15 percent by weight to avoid spoilage problems on storage of the flour product for extended periods of time prior to use by the consumer. The temperature and pressure conditions employed for cooking the corn according to this invention are relatively mild as compared with conventional prior art methods and relatively short processing times are employed.

FIGURE I is a diagram showing the various steps of the process.

In accordance with the process of the present invention, dehulled, degerminated corn is comminuted to a particle size to pass a U.S. 20 sieve. Other granulations are practical but in general finer grinds reduce the capacity of the grinding apparatus and coarser grinds require longer periods for complete processing of the corn. Preferably the corn is comminuted to a particle size less than about 10 mesh. The comminution of the corn can be accomplished by grinding in conventional mills or comminuting machines which will handle materials of this nature, for example a hammermill such as a Micro Pulverizer or a Fitz mill manufactured by the W. J. Fitzpatrick Company of Chicago, Illinois. Any degerminated, dehulled corn is suitable as a starting material. Degermination and dehulling can be accomplished by any method now practiced and well known to those skilled in the art which will reduce the fat content of the material to about 2% or less and reduce the hull to about 1% or less. Generally the dehulled, degerminated kernels will comprise from about 65 to 80% of the whole kernel.

After comminution to a suitable particle size, the moisture content of the dehulled, degerminated, comminuted corn is adjusted to a level from about 30 to 45% by weight. This can be done immediately upon entry into the actual cooker but is preferably carried out as a separate prconditioning step in a hydrator or conditioner. Preferably the temperature of the ground or comminuted corn is raised simultaneously with adjustment of its moisture content. Various apparatus having means for wetting and heating the corn can be advantageously employed to accomplish this preconditioning treatment. Commercially available high speed mixers having means to inject liquid and/or steam are satisfactory for this purpose. In a preferred procedure water is introduced into the conditioner in such amounts as to provide a moisture content in the comminuted corn of from about 30 to 35 percent. Simultaneously with adjustment of the moisture content, steam is introduced into the preconditioner to raise the temperature of the corn to about 170 to 180° F. The use of steam or other heating means is not absolutely necessary in this step but it is preferred because it facilitates absorption and distribution of the water by the corn and also by raising the temperature of the corn lessens the heating requirements in the subsequent cooking step. The period of treatment in the preconditioner is relatively short, generally ranging from about 10 seconds to 60 seconds and preferably from 15 to 20 seconds. The steam which is introduced into the preconditioner is at substantially atmospheric pressure and need not effect cooking of the corn but, if desired, partial cooking can be effected in this preconditioning step.

Following the preconditioning step, the comminuted corn is fed to a cooker which preferably takes the form of a screw conveyor apparatus having means for injecting or sparging live steam into intimate contact with the corn. One suitable screw conveyor cooker is illustrated in FIG.

2, commercially available units of this general type being frequently employed in the continuous blanching of fruit, vegtables, mushrooms and so forth. The apparatus shown comprises a tubular conveyor 11 containing a rotatable conveying worm 12. The conveyor is provided with a plurality of inlets 13 for injection of water or steam. There is a hopper 14 for the introduction of the comminuted corn. In use of this apparatus the rate of revolution of the worm is made variable by suitable means not illustrated and is so adjusted that corn fed into it will attain the desired temperature and will remain under treatment for sufficient time to bring it into the proper condition. The worm helps to agitate the corn and to assist the passage of heat into it so that it may be uniformly heated. In the conveyor cooker the preconditioned corn is subjected to the action of steam under substantially atmospheric pressure for a period generally ranging from about 3 to 10 minutes, preferably from 5 to 8 minutes whereby cooking of the corn is accomplished. The temperature of the corn leaving the conveyor cooker ranges from about 190 to 212° F. Product temperatures appreciably above 212° F. have been found unnecessary to produce a satisfactory corn product and are not employed. The moisture content of the corn discharging from the conveyor cooker should be in the range of 30 to 45 percent and preferably 35 to 40 percent. Other moisture contents can be employed, but lower moistures prolong the processing time and higher moistures render handling and drying of the product more difficult. The fine comminution of the corn permits intimate contact between the sparged steam and the particulate material with the result that the corn cooks with the use of essentially atmospheric pressure, relatively low cooking temperatures and relatively quickly. As a result of cooking, the absorption properties of the final corn flour are greatly improved from the standpoint of its suitability for preparing arepas or a base for polenta. That is, the material produced by the present process possesses the ability to absorb at least two parts water by weight to form a dough which can be readily handled and will reconstitute with about 3 to 5 parts of hot water to produce a suitable polenta base.

After cooking the corn in the cooker which is preferably a screw conveyor cooking apparatus, the corn is then preferably cooled prior to drying. The preferred method is to pass the material from the conveyor cooker through a fan or blower producing a current of air at room temperature. This cools the material and facilitates handling. Following cooling it is preferred to comminute the material to further reduce lumps prior to drying. It is preferred to dry the corn in a gas fired rotary drier wherein the inlet hot combustion gases are in the range of 500–1000° F., exit gas temperatures are in the range of 200–300° F. and product temperature from the drier is in the range of 150–200° F. Other methods of drying can be employed such as flash drying, pan drying or fluidized bed drying. The flour is preferably dried to a moisture content of between 10 and 14 percent (wet basis), or at least below 15 percent.

After drying, the dry flour is then classified or graded as by the use of a sifter. In this operation the corn flour having a size of 20 mesh or finer is ready for packaging and marketing while the coarser particles having a size larger than 20 mesh are passed to a hammermill to be re-ground in the dry state and reduced to a size equal to or smaller than 20 mesh for use as an arepa flour.

For polenta a more granular material is desired. This is produced by substituting for the hammermill a granulator, such as rolls or any other gentle device, as well known by those familiar in the art. Coarse or fine grades of polenta may be produced by, for example, granulating to pass a U.S. 16 sieve to produce coarse polenta or to pass a U.S. 25 sieve to produce fine polenta. In both cases the amount of fine material, such as material that will pass a U.S. 70 sieve, is held to a minimum, such as 10 percent or less, to reduce or eliminate the likelihood of lumping when the material is added to boiling or hot water in the preparation of polenta base.

Properties of the dough or masa for arepas or of the corn meal mush for polenta as reconstituted from the flour may be modified by introducing an additional step between cooking and drying. By subjecting the cooked wet corn at about 35 percent moisture, at which stage it is quite susceptible to starch modification, to a compressing or kneading action, it is possible to control the end properties of the flour over a range not attainable without the step. Increasing the degree of compression or kneading increases the cohesive properties of the masa or polenta base made from the flour. This in turn affects the forming characteristics and the final properties of the arepa or polenta base.

Utilizing this step, it is possible to attain a range of cohesiveness from a very "short," poorly cohesive dough, difficult to form, and yielding an arepa with a rough, badly cracked crust to a dough so cohesive that the arepa tends to become sealed and burst on baking. A degree of cohesiveness that causes the arepa to burst is undesirable. Within the range given, short of bursting, as cohesiveness is increased by increased kneading, the masa produced from the flour is more easily formed and produces an arepa with a smooth crust with little cracking. This range of cohesiveness covers the range desired by arepa consumers. Due to personal preferences, variation in preferences from region to region, from country to country, and variation in corn itself due to inherent or climatic conditions, it is highly advantageous to be able, in this manner, to satisfy natural differences in consumer preferences and to minimize or overcome the effect of variations in the starting material.

Additionally, the kneading step permits the making of either polenta or arepa flour using the same basic process. The degree of kneading influences the firmness and strength of the corn meal mush loaf used as a polenta base. Generally the properties desired in an arepa flour are in the same range of cohesiveness as those desired for polenta, but here again differences in consumer preferences and variations in starting material make it important to be able to vary the product within the range outlined.

One convenient way to carry out the kneading step is through the use of a press or extruder whereby the cooked material is squeezed through a series of orifices, such as a multiple-hole restricting die plate. The particulate cooked material is thereby formed into a dough and subjected to a squeezing or kneading action. Degree of treatment can be controlled by the amount of restriction used on the end plate. Generally it is not necessary to develop any degree of pressure at the die plate. This step may be carried out immediately after cooking, while the material is still hot and with cooling provided at the press and subsequent to it, or merely subsequent to the press. Alternatively the material may be cooled after cooking and just prior to the pressing. It is preferred to run the material to the press hot, since in this state it is more plastic than when cool and requires less work to accomplish the same result. A knife or cutter may be employed at the press to cut the pieces of dough into small segments or pellets. Following the pressing and cooling, we prefer to comminute the pellets to produce smaller particles which facilitate the drying step.

The invention is further illustrated by the following numbered examples.

*Example 1*

Degerminated, dehulled corn was ground on a Model D Fitz Mill using approximately 5600 r.p.m., a ⅛-inch round hole perforation retaining screen and a knife edged rotor. Water was added and mixed with the ground corn in a common batch type mixer raising the moisture of the mixture to 33.8 percent. The wetted corn was treated in a screw conveyor provided with steam injection openings through which steam at substantially atmospheric pressure was injected making intimate contact with the wet particles. The wetted mixture was exposed to steam for an average of 9.5 minutes and exited the conveyor at 41.2 percent moisture. The cooked mixture was cooled, comminuted on a Fitz Mill using a 1/8-inch round hole perforation screen, with 5600 r.p.m., and a serrated hammer rotor. After comminution the material was dried on a pan drier consisting of a perforated metal sheet through which heated air was passed. The cooked material was placed on the sheet such that the heated air passed through it. Following drying the material was ground on a hammermill in a way that it substantially would all pass a 20 mesh. The flour was mixed with approximately two parts water by weight and found to produce an excellent arepa masa. The masa was formed into arepas and baked on a grid placed over a hot plate and found to make an excellent arepa.

*Example 2*

Degerminated, dehulled corn was ground on a Model D Fitz Mill using 5600 r.p.m., a 1/32-inch round hole perforation retaining screen, and serrated hammers. The ground corn was wetted and preconditioned through a Sprout-Waldron preconditioner such as is commonly used ahead of pellet mills. Water and steam were mixed with the ground corn as it passed through the continuous mixer preconditioner in such a way that the mixture left the preconditioner at 29.9 percent moisture and 178° F. The preconditioned material was cooked as in Example 1 except its retention time in the steam conveyor averaged 4.5 minutes and it had an exit moisture of 35.9 percent and an exit temperature of 198° F. The material was cooled and then dried on the pan drier as above. Following drying the material was reground to pass a 20 mesh screen. The flour was formed into masa by the addition of approximately two parts water by weight, and then into arepas and baked as before. The flour produced excellent arepas.

*Example 3*

Degerminated, dehulled corn was ground on a Model D Fitz Mill using a 1/25-inch round hole perforation retaining screen, 5600 r.p.m and serrated hammers. The ground corn was mixed with water in a batch mixer to 33.3 percent moisture. The wet mixture was treated in the steam conveyor for an average of 4.5 minutes leaving the conveyor at 36.5 percent moisture and 200° F. The material was cooled and dried and ground to pass a 20 mesh as before. The flour was mixed with 2.2 parts water by weight and excellent masa and arepas were produced. The material was further evaluated by arepa consumers and judged excellent.

*Example 4*

Degerminated, dehulled corn was ground as in Example 3. The ground material was preconditioned as in Example 2 except its moisture content leaving the preconditioner was 34.1 percent and temperature was 175° F. Preconditioned material was cooked in the steam conveyor using an average retention time of 5.5 minutes. Exit moisture from the steam conveyor was 36.4 percent and exit temperature 198° F. The material was cooled and dried and ground to pass a 20 mesh as before. Arepas were made as before and judged excellent.

*Example 5*

Degerminated, dehulled corn was ground as in Example 3. Water and steam were mixed with the ground corn using the preconditioner previously described. Exit temperature was 165° F. and exit moisture was 32.5 percent. The preconditioned corn was treated in the steam conveyor for an average of 5.5 minutes. From the steam conveyor the material was cooled and then comminuted through a 1/4-inch round hole perforation screen. At this stage material was at 31.6 percent moisture. It was dried using a small rotary drier using an inlet temperature of hot gases of 750° F. The resulting gas temperature at the discharge of the rotary drier was 255° F. and product temperature 178° F. Product moisture was 12.5 percent. Material from the drier was cooled and ground to substantially pass a 20 mesh. It was then mixed with water and excellent arepas made from it.

*Example 6*

Degerminated, dehulled corn was ground on a hammermill using a 3/64-inch round hole perforation retaining screen. The ground corn was mixed with water but no steam using the preconditioner previously described. Exit moisture averaged 35.5 percent. The wetted mixture was then treated in a larger steam conveyor than previously used. The mixture was retained in the cooker for an average of 7.0 minutes and was treated with approximately 0.13 pound steam per pound of wetted corn. The exit moisture averaged 38.2 percent. The material discharging from the cooker was cooled by conveying through a fan, drawing room temperature air, to a cyclone collector. The cooled material was dried using a pan drier as previously described. It was then ground to substantially pass a 20 mesh. Arepas were made from the material as previously described and found to be excellent.

*Example 7*

Degerminated, dehulled corn was ground as in Example 3. Water was mixed with it in a batch mixer elevating the moisture to 33.8 percent. The wetted corn was treated in a steam conveyor for an average time of 7.75 minutes. Exit moisture was 36.5 percent and exit temperature 190° F. Material from the cooker was immediately comminuted using a Fitz Mill with a 5/32-inch round hole perforation retaining screen. Immediately after comminution the material was dried with hot air on a pan drier previously described. The dried material was ground to pass a 20 mesh. Arepas were made from it and these were judged excellent.

*Example 8*

Degerminated, dehulled corn was ground as in Example 3. Water was added to the ground corn in a batch mixer elevating the moisture of the mixture to 32.6 percent. The wetted corn was treated in a steam conveyor for approximately six minutes. Exit temperature was about 200° F. and exit moisture averaged 37.1 percent. A portion of the cooked material was cooled and then dried using a pan drier as previously described. A second portion of the cooked material was doughed and pressed using an auger-type press six inches in diameter and with a restricting die plate consisting of 222 1/4-inch diameter holes. Cooling water was used on the jacket of the press, and the dough material exited the press at 170–175° F. It was further cooled by conveying through an air leg to about 130° F. Following cooling, the material was ground using a Fitz Mill and a 7/32-inch diameter round hole perforation screen. After grinding, the material was dried on the aforementioned pan drier. Arepas were made from both samples and were judged to be quite good. The sample which was not pressed was "shorter" in the dough form, produced arepas of which the crusts showed more cracking, and were more brittle than the sample which had been subjected to treatment in the press prior to drying.

*Example 9*

Yellow, degerminated, dehulled corn was ground as in Example 3. Water was added to the ground corn in a batch mixer, resulting in a moisture content of 33.1 percent for the mixture. The wetted corn was treated in a steam conveyor for approximately five minutes. Exit temperature was 210° F. and average exit moisture was 37.4 percent. A portion of the cooked material was cooled and then dried using a pan drier as previously described. A second portion of the cooked corn was subjected to the same pressing action as in Example 8, was comminuted on the Fitz Mill using a 5/32-inch diameter round hole perforation retaining screen and dried on the pan drier as before. Dried product from both portions was granulated to pass a U.S. 25 sieve with a minimum of material passing a U.S. 70 sieve. Samples averaged less than 7 percent through a U.S. 70 sieve. The resulting products were made into polenta base by adding 150 grams to 675 milliliters of boiling water in a pan, continuing to heat the mixture for approximately 10 seconds, and pouring the mixture into a mold. Upon cooling, both products formed a suitable polenta base. The product from the material subjected to pressing during processing formed a firmer, stronger corn meal mush and showed less cracking on the surface during cooling, but both made suitable polenta bases within the range of desired cohesiveness.

The product produced according to this invention provides a corn flour which can be used to make arepas or polenta base with all the desired properties at a great saving to the user in time and effort. It eliminates the need for cooking of the corn or corn meal by the user and provides a stable flour from which arepas in any desired quantity or polenta bases can be made quickly. The flour produced for arepas has the ability to absorb at least 2 parts water by weight to form a dough in less than than one minute which can be readily handled and easily formed into cakes for baking. The water which is absorbed is held in a way that on baking the formed cakes, a biscuit is produced having a smooth crust with small uniform cracks and an interior which feels dry and crumbly and is not sticky to the touch. Other methods of preparing corn flours leads to doughs which may have the ability to absorb sufficient water but produce doughs which are too cohesive or tend to be rubbery or tight and/ or may be sticky with consequent difficulty in handling and forming or may burst at the time of baking.

The flour or meal produced for polenta has the ability to absorb 3 to 5 parts by weight of boiling or hot water to form a fluid corn meal mush which on cooling produces a firm, smooth corn meal mush suitable for use as a polenta base. Other methods of preparing corn meals produce materials which lack the ability to absorb sufficient water, require long cooking in preparation, form lumps at the time of mixing with water, or lack the desired degree of firmness or smoothness for polenta bases.

Further, the cooking time required for production of the corn flour is reduced to a few minutes and the moisture required during the presence of the corn is reduced to a range of about 40 percent or less thus resulting in greater ease in drying and reduced drying time and cost. Furthermore, the drying is carried out in one stage and the soluble materials which are normally lost in the cooking water in other prior art processes are retained in the product of this invention.

Those modifications and equivalents which fall within the spirit of the invention and the scope of the appended claims are to be considered part of the invention.

We claim:

1. A process for producing a precooked, storage-stable corn flour from substantially dehulled and substantially degerminated corn which comprises comminuting the dehulled, degerminated corn to a particle size not substantially greater than will pass through a U.S. #20 sieve, contacting said comminuted corn with water for a period of time sufficient to adjust the moisture content thereof to a value of about 30 to 45 percent by weight, and heating said corn to a temperature of about 190 to 212° F. for a period of time sufficient to effect cooking thereof while maintaining the moisture content thereof between about 30 and 45 percent and thereafter drying the product to a final moisture content of not more than about 15 percent by weight.

2. A process for producing a precooked, storage-stable corn flour from substantially dehulled and substantially degerminated corn which comprises comminuting the dehulled, degerminated corn to a particle size not substantially greater than will pass through a U.S. #20 sieve, contacting said comminuted corn with water for a period of time sufficient to adjust the moisture content thereof to a value of about 35 to 40 percent by weight, and heating said corn to a temperature of about 190 to 212° F. for a period of time sufficient to effect cooking thereof while maintaining the moisture content thereof between about 35 and 40 percent and thereafter drying the product to a final moisture content of not more than about 15 percent by weight.

3. A process for producing a precooked, storage-stable corn flour from substantially dehulled and substantially degerminated corn which comprises comminuting the dehulled, degerminated corn to a particle size not substantially greater than will pass through a U.S. #20 sieve, heating said comminuted corn to a temperature of from 170 to 180° F., and adjusting the moisture content thereof to a value from about 30 to 45 percent by weight, and then heating said corn to a temperature of from 190 to 212° F. for a period of time sufficient to effect cooking thereof while maintaining the moisture content thereof between about 30 and 45 percent and thereafter drying the final product to a final moisture content of not more than about 15 percent by weight.

4. A process for producing a precooked, storage stable corn flour from substantially dehulled and substantially degerminated corn which comprises comminuting the dehulled, degerminated corn to a particle size not substantially greater than will pass through a U.S. #20 sieve, heating said comminuted corn to a temperature of from 170 to 180° F. and adjusting the moisture content thereof to a value from about 35 to 45 percent by weight, and then heating said corn to a temperature of from 190 to 212° F. for a period of time sufficient to effect cooking thereof while maintaining the moisture content thereof between about 35 and 40 percent and thereafter drying the final product to a final moisture content of not more than about 15 percent by weight.

5. A process for producing a precooked, storage-stable corn flour from substantially dehulled and substantially degerminated corn which comprises comminuting corn to a particle size not substantially greater than will pass a U.S. #20 sieve, heating said comminuted corn material to a temperature of from about 170 to 180° F. and adjusting the moisture content thereof to a value of from about 30 to 45 percent and then passing said comminuted corn through a zone wherein it is contacted with steam at substantially atmospheric pressure under conditions to achieve a product temperature from about 190 to 212° F. to effect cooking thereof and thereafter drying the final product to a final moisture content of not more than about 15 percent by weight.

6. A process for producing a precooked storage-stable corn flour from substantially dehulled and substantially degerminated corn which comprises comminuting the dehulled, degerminated corn to a particle size not substantially greater than will pass through a U.S. #20 sieve, heating said comminuted corn material to a temperature from about 170 to 180° F. and adjusting the moisture content thereof to a value from about 35 to 40 percent, then passing said comminuted corn through a zone wherein it is contacted with steam, the residence time in said zone being from 3 to 10 minutes and being sufficient to achieve a product temperature of 190 to 212° F. and drying the product to a final moisture content of not more than about 15 percent by weight.

7. A process for producing a precooked, storage-stable corn flour from substantially dehulled and substantially degerminated corn which comprises comminuting the dehulled, degerminated corn to a particle size not substantially greater than will pass through a U.S. #20 sieve, contacting said comminuted corn with water for a period of time sufficient to adjust the moisture content thereof to a value of about 30 to 45 percent by weight, and heating said corn to a temperature of about 190 to 212° F. for a period of time sufficient to effect cooking thereof while maintaining the moisture content thereof between about 30 and 45 percent, and subjecting the heated corn to kneading, while maintaining the moisture content thereof between about 30 and 45 percent, and thereafter drying the product to a final moisture content of not more than about 15 percent by weight.

References Cited by the Examiner
UNITED STATES PATENTS

| | | | |
|---|---|---|---|
| 136,305 | 2/73 | Chichester | 99—93 |
| 334,245 | 1/86 | Lauer | 99—93 |
| 3,046,139 | 7/62 | Gould et al. | 99—93 |

A. LOUIS MONACELL, *Primary Examiner.*

UNITED STATES PATENT OFFICE
CERTIFICATE OF CORRECTION

Patent No. 3,212,904

October 19, 1965

Max R. Gould et al.

It is hereby certified that error appears in the above numbered patent requiring correction and that the said Letters Patent should read as corrected below.

Column 5, line 5, for "1/6-inch" read -- 1/8-inch --; column 8, line 33, for "45" read -- 40 --.

Signed and sealed this 5th day of July 1966.

(SEAL)
Attest:

ERNEST W. SWIDER
Attesting Officer

EDWARD J. BRENNER
Commissioner of Patents